United States Patent [19]

Zelinski et al.

[11] 3,896,621

[45] Aug. 5, 1975

[54] DATA PROCESSOR SYSTEM DIAGNOSTIC ARRANGEMENT

[75] Inventors: Paul A. Zelinski, Elmhurst; Leo V. Jones, Jr., Chicago, both of Ill.

[73] Assignee: GTE Automatic Electric Laboratories Incorporated, Northlake, Ill.

[22] Filed: Apr. 6, 1973

[21] Appl. No.: 348,575

[52] U.S. Cl. ........................ 340/172.5; 235/153 AK

[51] Int. Cl.$^2$ ................ G06F 11/00; G06F 11/06; G01R 31/00

[58] Field of Search... 235/153 A, 153 AC, 153 AE, 235/153 AK; 340/172.5, 146.1 BE, 146.1 D

[56] References Cited

UNITED STATES PATENTS

| | | | |
|---|---|---|---|
| 3,252,149 | 5/1966 | Weida | 340/172.5 |
| 3,286,239 | 11/1966 | Thompson et al. | 340/172.5 |
| 3,303,474 | 2/1967 | Moore et al. | 340/172.5 |
| 3,343,141 | 9/1967 | Hackl | 340/172.5 |
| 3,409,877 | 11/1968 | Alterman | 235/153 AE |
| 3,444,528 | 5/1969 | Lovell | 340/172.5 |
| 3,471,686 | 10/1969 | Connell | 235/153 |
| 3,497,685 | 2/1970 | Stafford et al. | 235/153 |
| 3,509,541 | 4/1970 | Gordon | 340/172.5 |
| 3,517,171 | 6/1970 | Avizienis | 235/153 AE |
| 3,517,174 | 6/1970 | Ossfeldt | 235/153 |
| 3,518,413 | 6/1970 | Holtey | 235/153 |
| 3,560,935 | 2/1971 | Beers | 340/172.5 |
| 3,562,716 | 2/1971 | Fontaine | 340/172.5 |
| 3,568,157 | 3/1971 | Downing | 340/172.5 |
| 3,573,751 | 4/1971 | Delisle | 340/172.5 |
| 3,576,541 | 4/1971 | Kwan | 340/172.5 |
| 3,585,599 | 6/1971 | Hitt | 235/153 AC |
| 3,624,372 | 11/1971 | Philip | 235/153 |
| 3,626,383 | 12/1971 | Oswald | 340/172.5 |
| 3,646,519 | 2/1972 | Wollum | 340/172.5 |
| 3,678,463 | 7/1972 | Peters | 340/172.5 |
| 3,681,758 | 8/1972 | Oster et al. | 340/172.5 |
| 3,688,099 | 8/1972 | Buscher | 235/153 AE |
| 3,688,263 | 8/1972 | Balogh et al. | 340/172.5 |
| 3,735,356 | 5/1973 | Yates | 235/153 AE |

*Primary Examiner*—Gareth D. Shaw
*Assistant Examiner*—James D. Thomas

[57] ABSTRACT

A diagnostic arrangement for controlling the isolation of the cause of fault conditions occurring in a data processor system having a pair of synchronously operating data processors for generating pairs of data signals, monitors the data signals for fault conditions and serves as a communication link between the processors. The arrangement includes an isolation control circuit for causing the pair of data processors to halt their normal processing operations and for causing them to initiate subsequently at least one series of predetermined operations and thus to generate sequentially a series of test signal conditions, a read only memory for storing correct signal conditions, and a matching circuit for comparing at least one of said second test signal conditions from the data processors with the correct signal condition stored in the read only memory to generate a match signal if the compared signal conditions are the same as the correct signal condition. A logic circuit detects a certain predetermined code contained in the correct signal condition stored in the read only memory and in response thereto controls selectively the series of predetermined operations of the data processors so that the data processors can either perform the entire series of operations in an uninterrupted manner, or can be incremented sequentially through a fewer number of the predetermined operational steps.

12 Claims, 17 Drawing Figures

PATENTED AUG 5 1975 3,898,621

SHEET 2

THIRD PARTY CONTROL LOGIC

THIRD PARTY DETECTOR CIRCUIT TPD

DATA PROCESSOR SYSTEM DIAGNOSTIC ARRANGEMENT

BACKGROUND OF THE INVENTION

1. Field of the Invention

This invention relates to a diagnostic arrangement for a data processor system, and it more particularly relates to a diagnostic maintenance arrangement for a data processor system for controlling the isolation of the cause of malfunctions occurring in the data processor system.

2. Description of the Prior Art

For reliability and maintenance purposes, data processor systems have included duplicated pairs of data processors operating in synchronism. Selected pairs of signals of the processors are monitored to determine the existence of mismatches between the monitored signals of each pair thereof. Such a mismatch indicates a malfunction or fault condition of the data processor system. However, once a fault condition has been detected, it would be highly desirable to have a diagnostic maintenance arrangement which can facilitate the controlling of the isolation of the cause of the malfunction occurring in the data processor system. For example, where two processors are employed, such an arrangement should help determine which one of the two data processors is faulty and thus generated the erroneous data signal condition. Such a diagnostic arrangement must necessarily determine the faulty data processor as rapidly as possible so that the faulty processor can be analyzed to determine the source of the problem and the problem corrected and so that the repaired or replaced processor may be returned to its on-line operation as soon as possible.

SUMMARY OF THE INVENTION

The object of this invention is to provide a new and improved diagnostic arrangement, which operates in response to a fault condition occurring in a data processor system to control the isolation of the cause of the fault condition.

Briefly, the above and further objects are realized in accordance with the present invention by providing a diagnostic arrangement for reacting to fault conditions occurring in a data processor system, the arrangement including an isolation control circuit for causing the data processor system to halt their normal processing operations and for causing the system to initiate subsequently at least one series of predetermined operations and thus to sequentially generate a series of test signal conditions. A matching circuit compares the test signal conditions with certain correct signal conditions stored in a memory to generate a match signal if the test signal condition is the same as the correct signal condition. The diagnostic arrangement also includes a logic circuit which responds to a predetermined code contained in the correct signal condition stored in the memory for either causing the entire series of operations to be performed or causing the data processor system to be incremented through a fewer number of the steps of the series of predetermined operation.

Where a pair of data processors are employed in the data processor system, the data processors perform the same series of operations simultaneously, and the test signal conditions from each data processor are sequentially matched with the correct signal conditions stored in the memory so that the faulty data processor may be determined. The diagnostic arrangement is incorporated in a third party circuit, and serves as a communication link between the pair of data processors for diagnostic purposes.

CROSS-REFERENCES TO RELATED APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. patent application Ser. No. 130,133 filed Apr. 1, 1971 by K. E. Prescher, R. E. Schauer and F. B. Sikorski, and a continuation-in-part thereof Ser. No. 342,323, filed Mar. 19, 1973, hereinafter referred to as the SYSTEM application, now U.S. Pat. No. 3,835,260. The system may also be referred to as No. 1 EAX or simply EAX.

The memory access, and the priority and interrupt circuits for the register-sender subsystem are covered by U.S. patent application Ser. No. 139,480 filed May 3, 1971 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851 filed Nov. 24, 1971 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909 by J. P. Caputo and F. A. Weber for a DATA HANDLING SYSTEM ERROR AND FAULT DETECTING AND DISCRIMINATING MAINTENANCE ARRANGEMENT, Ser. No. 270,910 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912 by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972 by J. W. Eddy for an INTERLOCK ARRANGEMENT FOR A COMMUNICATION SWITCHING SYSTEM, Ser. No. 311,606 filed Dec. 4, 1972 by J. W. Eddy and S. E. Puccini for a COMMUNICATION SYSTEM CONTROL TRANSFER ARRANGEMENT, Ser. No. 303,157 filed Nov. 2, 1972 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. patent application Ser. No. 347,281, filed Apr. 9, 1973 by C. A. Kalat, E. E. Wodka, W. W. Clay and P. R. Harrington for a STORED PROGRAM CONTROL IN A COMMUNICATION SWITCHING SYSTEM hereinafter referred to as the EXECUTIVE PROGRAM patent application.

The above system, register-sender, marker, communication register, and executive program patents and applications are incorporated herein and made a part hereof as though fully set forth.

DESCRIPTION OF THE PREFERRED EMBODIMENT

Figure 1:
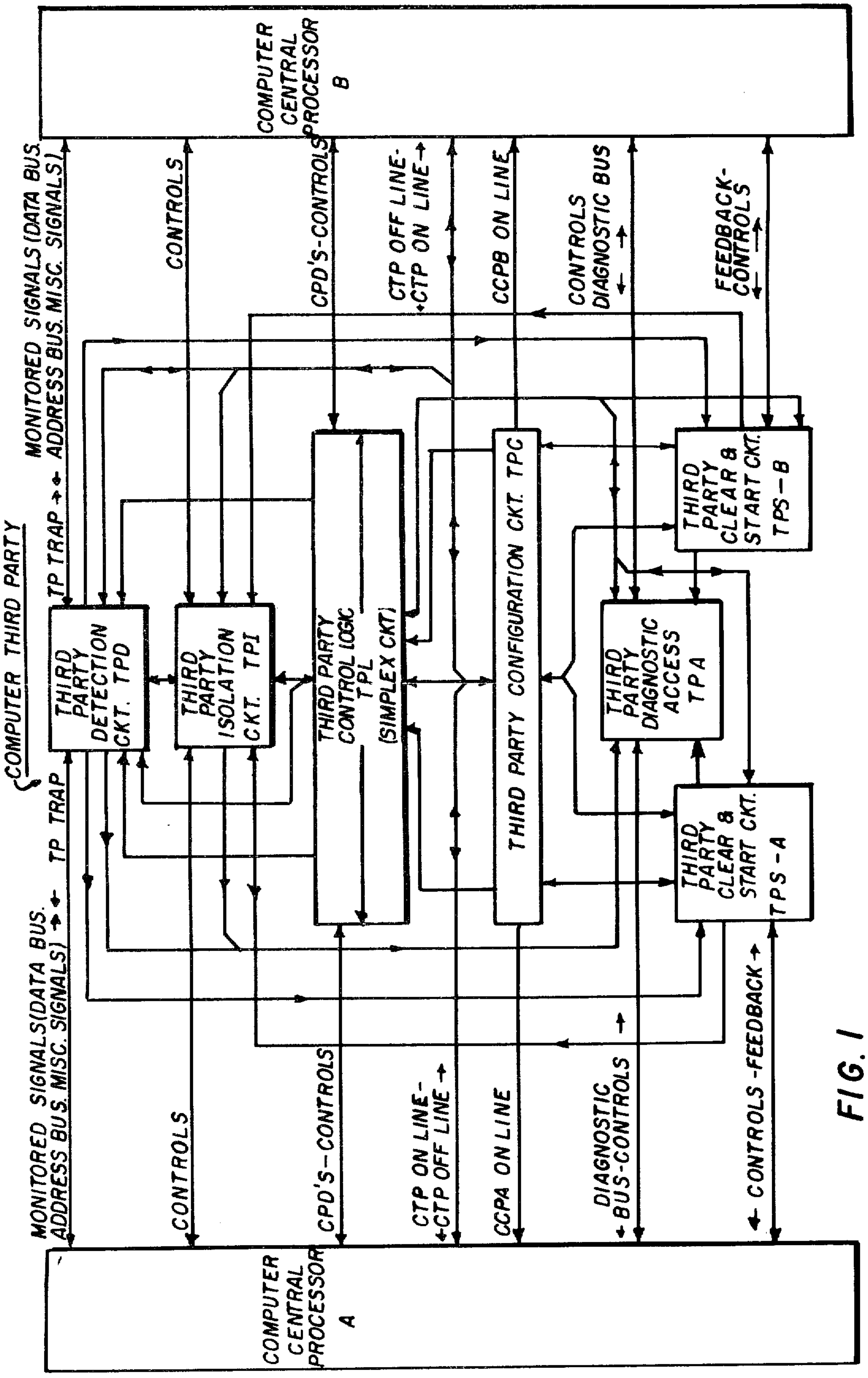
FIG. 1 is a block diagram of the computer third party circuit incorporating the diagnostic arrangement of the present invention.
Figures 14, 16:
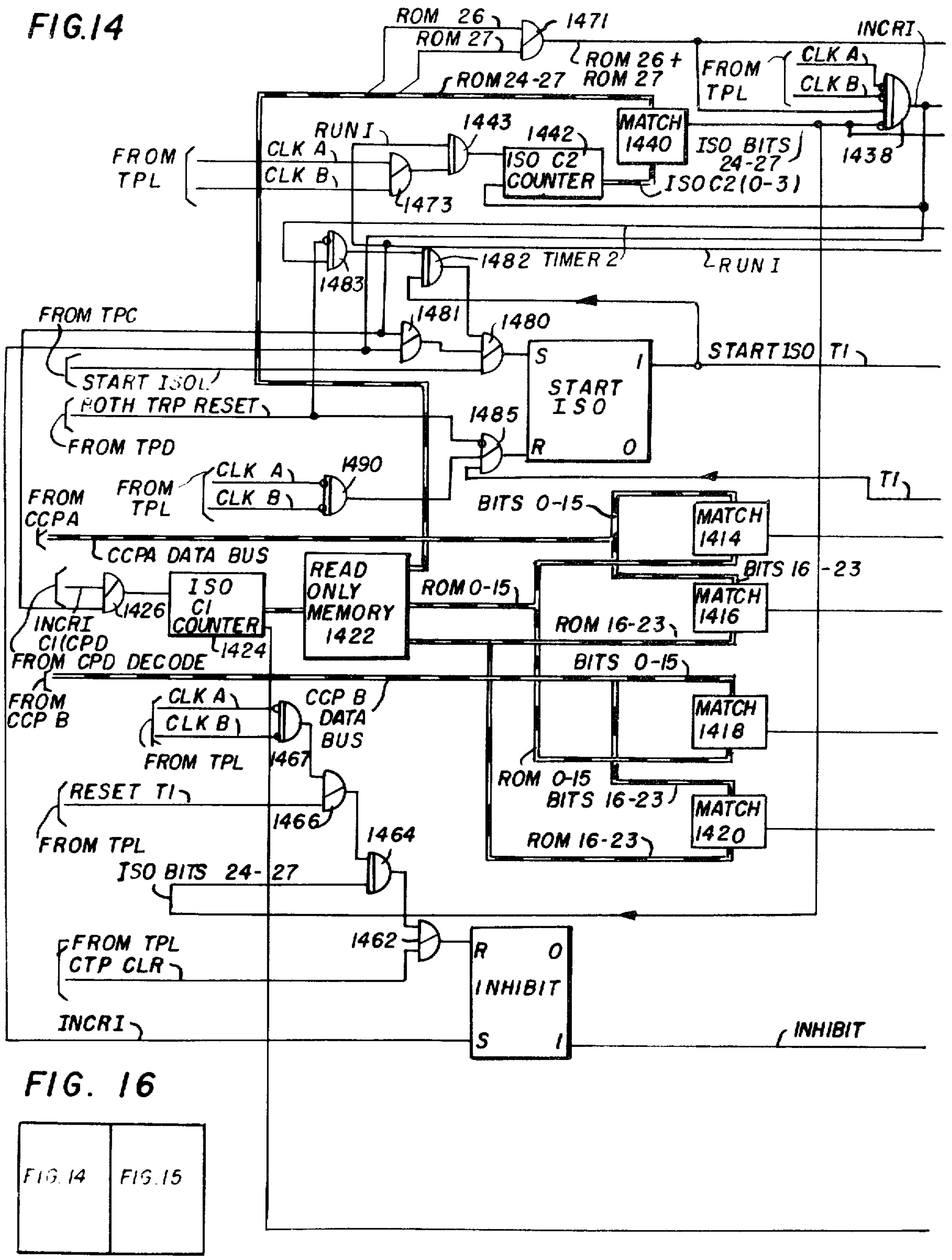
FIGS. 14 and 15 when arranged as shown in FIG. 16 are functional block diagrams of the third party isolation circuit of FIG. 1.
Figure 15:
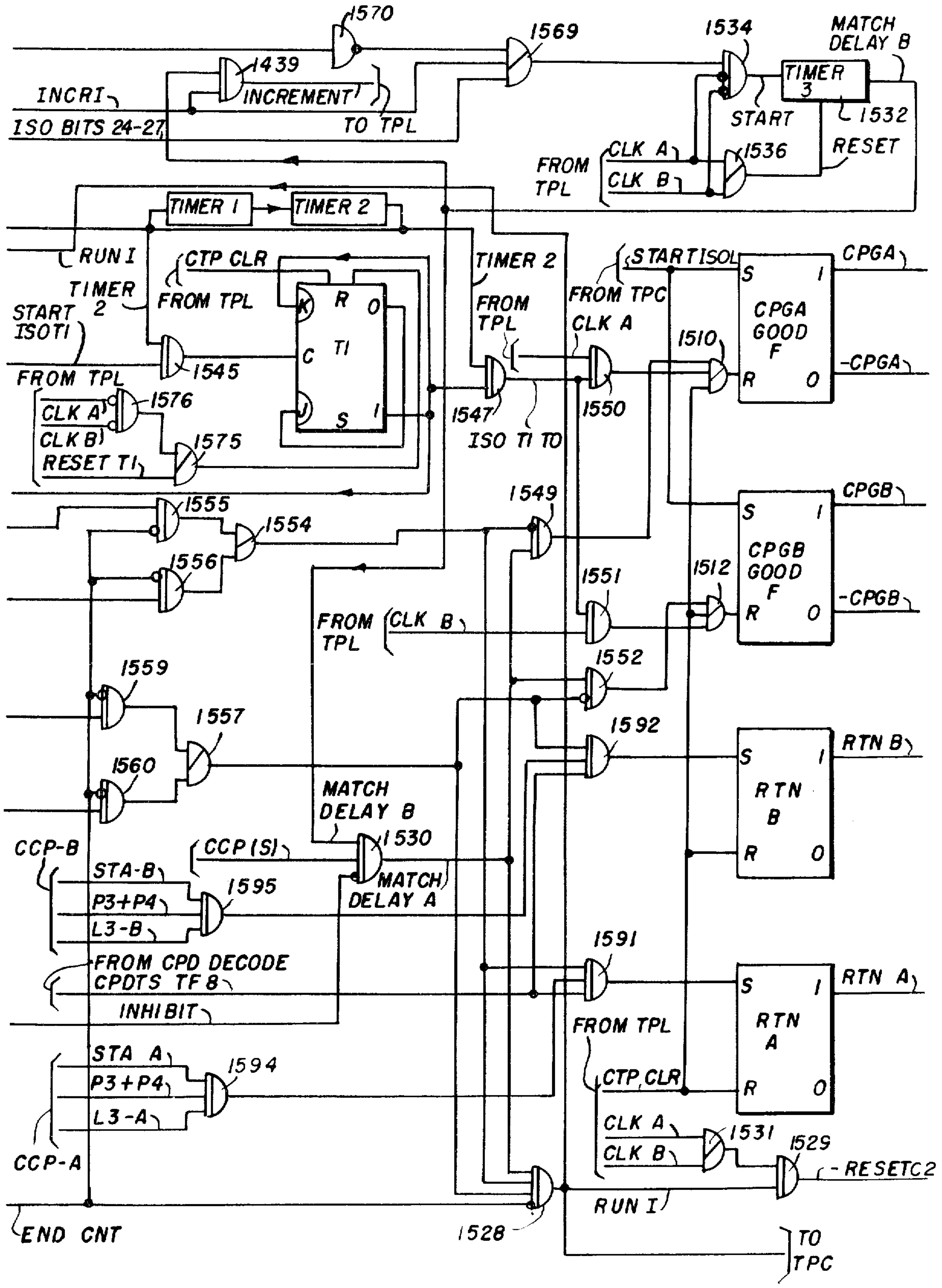

Referring now to FIGS. 1, 14 and 15 of the drawings, there is shown a computer third party circuit (FIG. 1) serving a pair of computer central processors CCP-A and CCP-B and a third party isolation circuit (FIGS. 14 and 15) which forms a portion of the third party circuit of FIG. 1. The diagnostic arrangement of the present invention is principally incorporated in the third party isolation circuit.

The computer third party circuit contains circuitry for aiding the performance of maintenance of the data processor unit DPU, and includes a detection circuit TPD, an isolation circuit TPI with a read only memory, a configuration circuit TPC, a control and clear start circuit TPS, a logic control circuit TPL, and a diagnostic access circuit TPA.

The detection circuit TPD provides means of detecting a malfunction of all outputs of the two processors CCP(s) to external subsystem, whenever both CCP(s) are on-line. This is accomplished by comparing the data buses, address buses, and other indicators of the two central processors. If a CCP non-comparison is detected either by the third party circuit CTP or the computer memory control CMC (FIG. 2), a third party trap signal is generated by the detection circuit. The non-comparison is referred to as a trap condition. The isolation circuit with a read only memory is used for part of the isolation procedure to determine the identity of a malfunctioning processor configuration group PCG.

Figure 2:
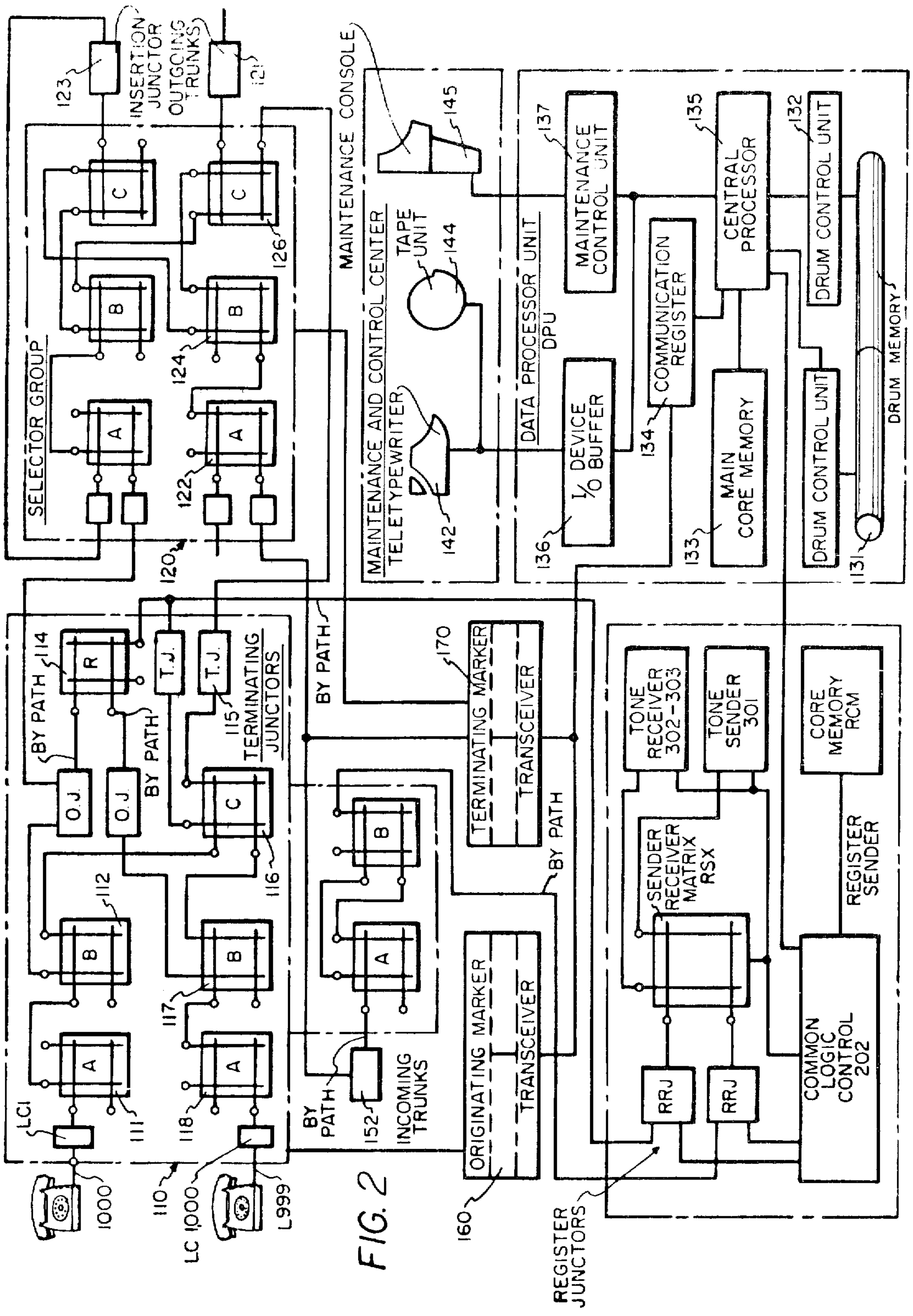
FIG. 2 is a simplified block diagram of a communication switching system incorporating the computer third party circuit in the data processor unit thereof.
Figure 3:
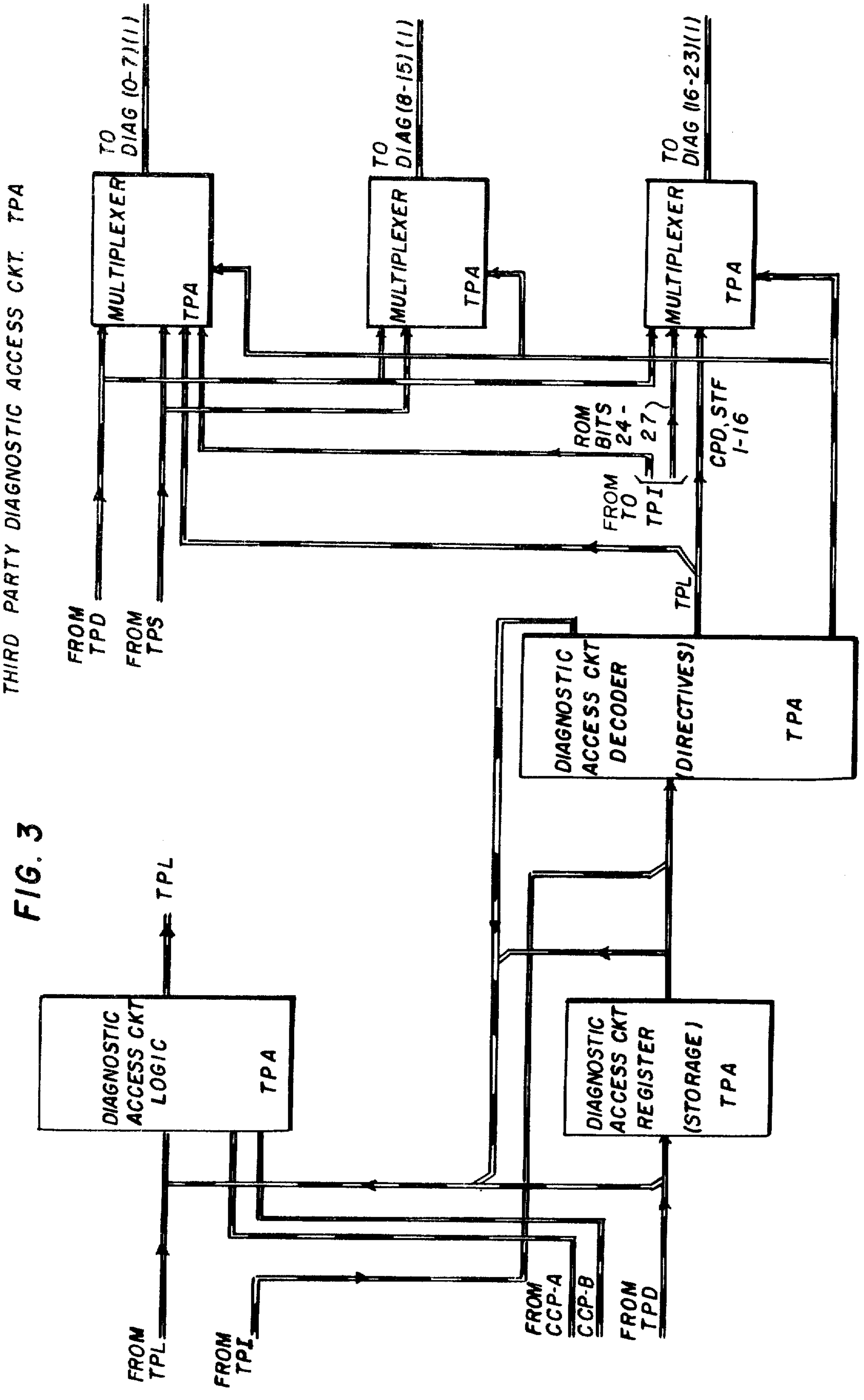
FIG. 3 is a block diagram of the third party diagnostic access circuit of FIG. 1.
Figure 4:
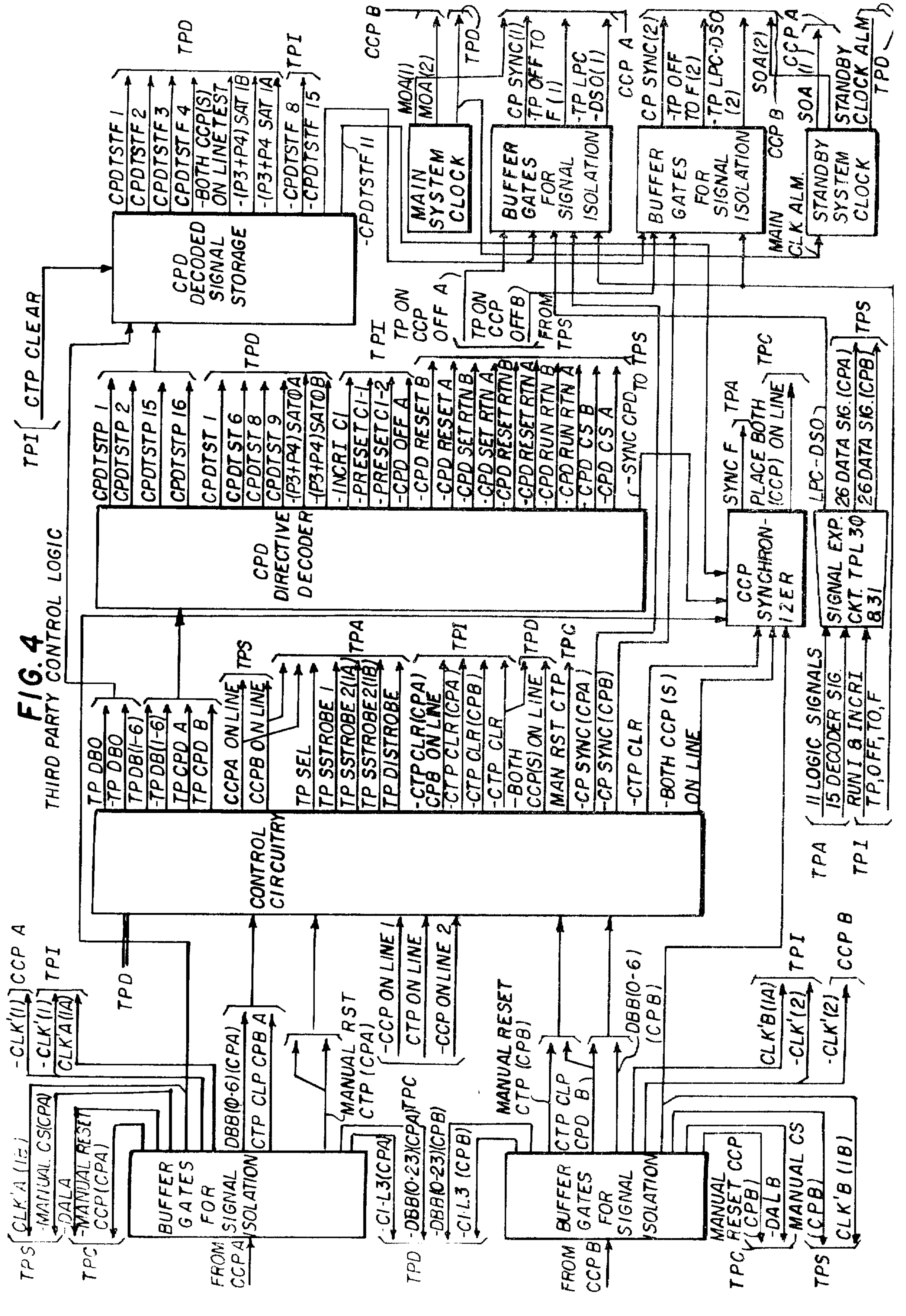
FIG. 4 is a block diagram of the third party logic circuit of FIG. 1.
Figure 5:
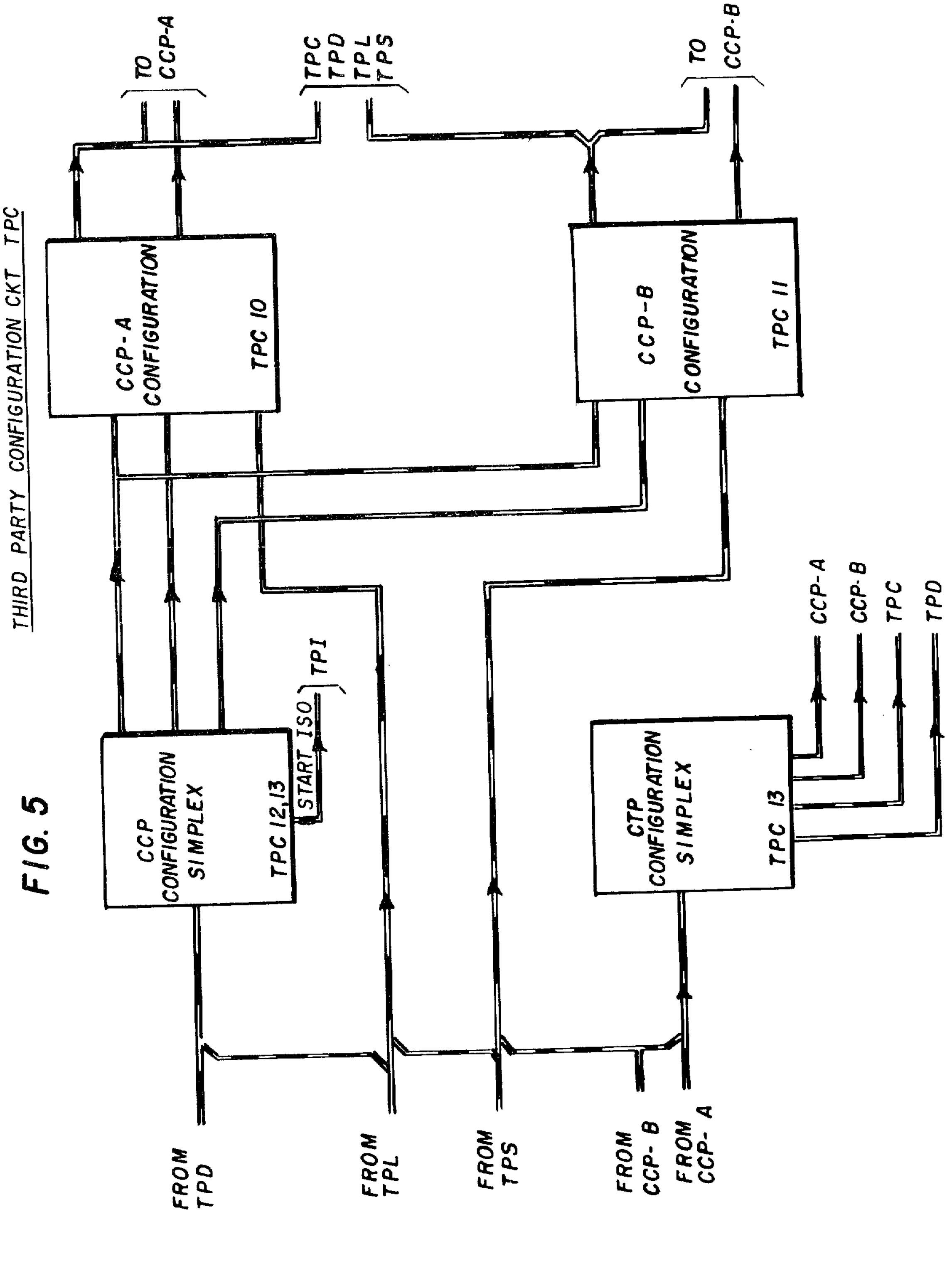
FIG. 5 is a block diagram of the third party configuration circuit of FIG. 1.
Figure 6:
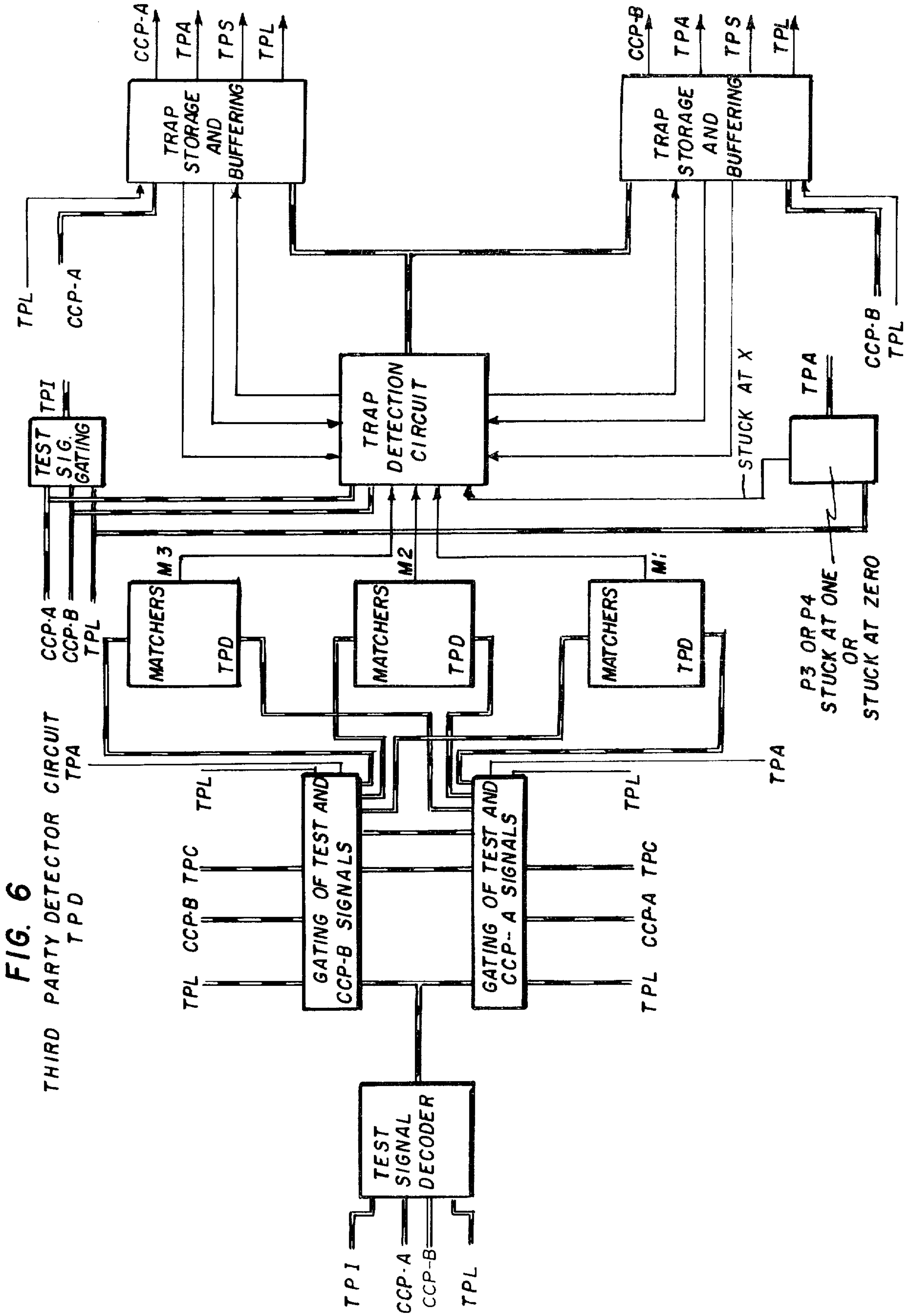
FIG. 6 is a block diagram of the third party detection circuit of FIG. 1.

Briefly, in use, once the detection circuit TPD detects a malfunction, the CCP(s) and the isolation circuit all participate in a CCP isolation procedure under the control of a software program store in the data processor core memory (FIG. 2). The CCP(s) run a series of exercise routines and stop at the end of each routine. The isolation circuit checks the results of each CCP exercise routine with those it has stored in its own memory. If, at selected time, the isolation circuit finds that the results of a CCP exercise routine does not check with its own or that the CCP does not stop, then that CCP is judged "bad" and all three parties leave the CCP isolation procedure. If the results of both CCP exercise routines check and both CCP(s) stop at the end of each routine, the CCP(s) continue to run exercise routines until all tests are complete, at which time the CCP isolation procedure is exited with a "both good" analysis. Once the CCP isolation procedure is completed, the functions of the isolation circuit are also completed. A COMPLETE signal will be generated at the end of CCP isolation procedure.

The configuration control circuit TPC provides the means for controlling the configuration of the CCP-CTP Complex under all allowable conditions. The circuit TPC is involved with third party circuit CTP functions in five ways:

1. When a CTP trap occurs, both computer central processors CCP(s) will be taken off-line for maintenance processing. A processor or processors will not be returned to normal processing until the isolation procedure is completed.

2. The circuit TPC is an integral part of the isolation procedure in determining the cause of a CTP trap. At the completion of the isolation procedure, a functioning entity of the computer complex (CCP-CTP) will be determined. The circuit TPC will return that entity on line for recovery to normal processing.

3. After repair and repair verification on a faulty unit of the complex CTP-CCP, the TPC circuit is used to return the repaired unit back to service. 4. The circuit TPC is routined during preventive maintenance periods for latent faults.

5. The circuit TPC is used by the PCC clear and start circuit (not shown) for controlling the configuration of the computer complex during a PCG clear and start procedure.

The control and clear start circuit TPS provides means to recover the processor configuration group PCG (not shown) from an unknown state to a condition in which at least one configuration of data processing elements is available for normal call processing operations. This circuit is also used to select alternate minimum PCG configurations in an attempt to restart the system as a last resort recovery procedure.

The control circuit portion of the circuit TPS provides the control interface between the processors CCP(s) and the circuit CTP and to provide common control functions for CTP circuits. In addition to the control interface the control circuit provides the necessary control signals for re-initializing the processors CCP(s) after malfunction detection or CCP isolation. A timer is also provided for initializing a processor CCP if both processors CCP(s) were kept off line for over a predetermined time period.

The diagnostic access circuit TPA is similar to an I/O controller of the unit DPU, and serves as a communication link between the processors CCP-A and CCP-B. It is controlled by an on-line processor CCP for localizing faults or doing preventive maintenance routines on an off-line CCP or the CTP circuit. The diagnostic access circuit is involved with the computer third party functions in three ways:

1. During localization and/or repair verification of a faulty unit in the computer complex, the diagnostic access circuit is used for monitoring results and communicating from working units to the faulty one. It is also used to pass simulated control signals from working units to the faulty one.

2. The diagnostic access circuit is used for preventive maintenance routines to insure that there are no latent faults in the computer complex.

3. The diagnostic access circuit is used during resynchronizing processors.

Computer Third Party Operation

There are basically two categories of CCP-CTP operations:

1. Maintenance processing — procedures for recovering normal duplex processing (system operations) in the presence of a failure or an error in the computer complex.

2. Preventive maintenance routining — periodic exercise routines initiated either manually or under program control for checking latent faults in the computer third party circuits.

Maintenance processing may be divided into seven phases:

| | | |
|---|---|---|
| I. | Detection | recognition of a malfunction |
| II. | Isolation | determination of malfunctioning party |
| III. | Configuration | elimination of the malfunctioning unit from the computer complex |
| IV. | Recovery | returning the computer complex to normal processing in a predetermined state |
| V. | Diagnosis | localization of the source of malfunction for repair |
| VI. | Repair Verification | check on validity of repair performed on malfunctioning unit |
| VII. | Resynchronization | return of the repaired unit to the computer complex for normal processing |

Under normal operation conditions both processors CCP(s) and the circuit CTP will be on-line and the processors CCP(s) will operate in synchronism.

PHASE I — Upon recognition of a malfunction by the detection circuit, a CTP trap condition will occur disrupting normal processing and initiating maintenance processing procedures. Both CCP(s) will be taken off-line by the configuration circuit; and the isolation circuit will be initiated. The third party trap recognition program will first be run, saving information about the system status, at the time when the third party trap occurred, for use in later phases.

PHASE II — The CTP-CCP complex isolation program will then be run. It will try to determine whether a third party trap was caused by a fault in one of the following systems, extended CCP, the circuit CTP, the core memory control circuit CMC, the main core memory CMM and the identification of the faulty party to a processor configuration group (PCG-A, PCG-B) or the circuit CTP. The isolation program consists of two phases, the first phase testing the duplex subsystems (extended CCP, CMC and CMM) for a fault condition, and the second phase being a check on the third party circuit hardware to either verify or nullify the results of the first phase.

PHASE III — When the isolation procedure finds a fault, it will identify the configurable party (PCG or CTP) for use by a third party configuration program. A functioning configuration thus will be derived for returning to normal processing by a CCP-CTP complex fault recovery program (Phase IV*a*). In addition, the identity of the isolation program module that detected the fault will be saved for localization programs. Should the isolation program fail to find a fault, an error count which is kept in the processor memories, will be incremented. If the error count is found to be excessive of a predetermined value, the isolation program will initiate a system clear and start procedure, otherwise it will branch to a CCP-CTP complex error recovery program (Phase IV*b*).

PHASE IV*a* — After a faulty group PCC or the circuit CTP has been isolated and reconfigured off-line, the good processor will be returned to normal processing. This transition from the third party mode to normal processing is done with the aid of the CCP-CTP complex fault recovery program. Since the third party isolation procedure has put the PCG hardware in an abnormal state, the PCG group must be initialized to a normal state to provide a smooth transition to normal processing. The fault recovery program will perform this initialization. In addition it will pass control to the system executive program as disclosed in the EXECUTIVE PROGRAM patent application, at the completion of initialization.

PHASE IV*b* — When a CCP-CTP complex isolation program fails to find a fault, the malfunction that caused the third party trap is assumed to be an error. It is the function of the CCP-CTP complex error recovery program to return the CTP-CCP to the system executive program in condition to perform normal processing. The error recovery program includes initialization of PCG hardware and passage of information about the third party trap to the executive program, returning the PCG(s) to synchronous operation (Phase VII). At the completion of the error recovery program the processors will no longer be running in a third party trap mode.

PHASE V — Diagnostic service for the faulty module ill be scheduled after the CTP-CCP complex fault re›very program is completed. The on-line processor CP will run a localization and verification program r the faulty module at the schedule time, using the di;nostic access circuit as the communication link be‹een the two processors.

PHASE VI — After a malfunctioning module is reiired, diagnostic service for that module will be reıested so that repair performed on the module may be ılidated. If repair is indeed verified, an update for the paired unit will be requested and performed.

PHASE VII — A resynchronization program will upıte the dynamic variables of the off-line module from e on-line CCP after which the CTP-CCP complex will turn to synchronous operation.

The computer third party circuit is periodically rouıed so that latent faults may be detected and elimiıted. The detection circuit and the isolation circuit e routined with both processors on-line. Thus they ay be initiated under program control. The remaining rcuits are routined with only one processor CCP onıe and should be manually initiated. The reason for is is that the program cannot take a working CCP or TP off-line.

General System Description

The computer third party circuit CTP is incorporated the data processor unit DPU of a telephone switchg system, which is shown in simplified form in FIG. . The system is disclosed in said SYSTEM patent ap.ication, and also in said REGISTER-SENDER MEMRY CONTROL patent application. The system comrises a switching portion comprising a plurality of line ·oups such as line group 110, a plurality of selector ·oups such as selector group 120, a plurality of trunk;gister groups such as group 150, a plurality of origiıting markers, such as marker 160, and a plurality of ·rminating markers such as marker 170; and a control ɔrtion which includes register-sender groups such as S, data processing unit DPU, and a maintenance conol center 140. The line group 110 includes reed-relay vitching network stages A, B C and R for providing ıcal lines L000-L999 with a means of accessing the ‹stem for originating calls and for providing a means f terminating calls destined for local customers. The unk-register group 150 also includes reed-relay vitching networks A and B to provide access for inɔming trunks 152 to connect them to the register:nder, the trunks also being connected to selector in·ts. The selector group 120 forms an intermediate vitch and may be considered the call distribution cen:r of the system, which routes calls appearing on its in·ts from line groups or from incoming trunks to approriate destinations, such as local lines or outgoing unks to other offices, by way of reed-relay switching ages A, B and C. Thus the line group 110, the trunk;gister groups 150, and the selector group 120 form ıe switching network for this system and provide fullıetallic paths through the office for signaling and ansmission.

The originating marker 160 provides high-speed conol of the switching network to connect calls entering ıe system to the register-sender 200. The terminating ıarkers 170 control the switching networks of the se·ctor group 120 for establishing connections there›rough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the senderreceiver matrix RSX. The common logic control 202, and the core memory RCM form the register apparatus of the system, and provide a pool of registers for storing call processing information received via the registerjunctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle paths in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical System Call

A simplified explanation of how a basic call is processed by the system. The following call is a call from a local party served by one switching unit to another local party served by the same switching unit.

In the following presentations, reed relays are referred to as correeds. Not all of the data processing operations which take place are included.

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuits of the register-sender sets up a hold ground in the register junctor. The marker, after observing the register junctor hold ground and that the network is holding, disconnects from the matrix. The entire marker operation takes approximately 75 milliseconds.

Following the register junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled on the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases and then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory slot and releases itself from the call. The dedicated call history table (for that register) in the data processor core memory is returned to idle.

Third Party Configuration Circuit Logic Equations

The configuration circuit TPC is provided to change the on-line status of the duplicated processors CCP-A and CCP-B of the unit DPU. The following is a list of Boolean logic equations which define the functions of the logic circuits (not shown) of the configuration circuit TPC:

1) CTP ON LINE (set)

$$= \text{CPDA CTP ON . CPA ON LINE} + \text{CPDB CTP ON . CPB ON LINE}$$

CTP ON LINE (reset)

$$= \overline{\text{SWCHGD}} + \overline{\text{MANUAL RESET}} + \overline{(\text{-CTP OFF LINE /A/})} + \overline{(\text{-CTP OFF LINE /B/})} + \text{CPA ON LINE . CPDA CTP OFF . (-CPB ON LINE)} + \text{CPB ON LINE . CPDB CTP OFF . (-CPA ON LINE)}$$

2) (-CTP ON LINE)

$$\overline{\text{CTP ON LINE}}$$

3) ENABLE FORCE CONFIGURATION $$= \overline{\text{SWCHGD}} + \text{PLACE ONE CP ON LINE} + \overline{\text{CTP ON LINE}} + \overline{(\text{-CTP OFF LINE /A/})} + \overline{(\text{-CTP OFF LINE /B/})} + \text{(COMPLETE) . (CTP ON LINE)}$$

-Continued

NOTE: This output is a pulse ranging between 150 and 320 ns. except when switch S-1 is used to generate (SWCHGD).

4) FORCE CPA ON -FORCE CPB ON = Logic one for:
SWCHGD
+CPGA GOODF
.(CPGB GOODF)
.(COMPLETE)
= Logic zero for:
SWCHGD
.CPGA GOODF
.CPGB GOODF
.COMPLETE NOTE: This function will toggle between Logic one and Logic zero whenever the CTP ON LINE flop is reset, or
PLACE ONE CP ON LINE becomes true, or either (-CTP OFF LINE /A/) or (-CTP OFF LINE /B/) goes false.

5) (-GDF CPR) = CPGA GOODF . CPGB GOODF
+CPGA GOODF . CPGB GOODF 6) (-RESET CPA ON LINE FLOP) = (-CCP OFF LINE /A/)
.(-CCP OFF LINE /B/)
. START ISOL 7) (-RESET CPB ON LINE FLOP) = (-CCP OFF LINE /A/)
.(-CCP OFF LINE /B/)
.START ISOL 8) (-SET CPA ON LINE FLOP) = CTP ON LINE + CPB ON LINE
+PLACE BOTH /CCP/ ON LINE
+(-GDF CPR)

9) (-SET CPB ON LINE FLOP) = CTP ON LINE + CPA ON LINE
+PLACE BOTH /CCP/ ON LINE
+(-GDFCPR)

10) START ISOL set = (-TRAP) . CP SYNC . (TP − DALA + TP − DALB)
reset = (-TRAP)

11) (-START ISOL) = START ISOL

12) SWCHGD = Switch S-1 in "off" position

Third Party Control and Clear Start Circuit TPS

Figure 7:
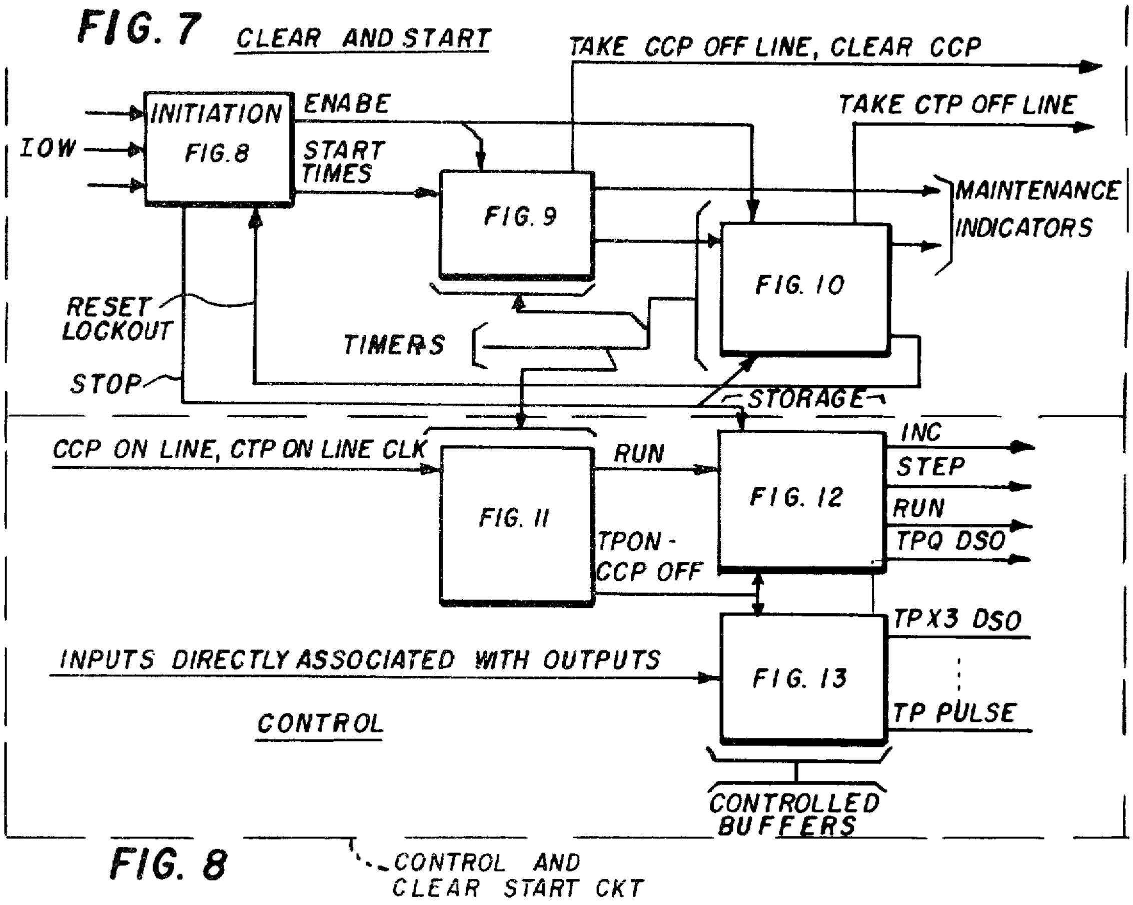
FIG. 7 is a block diagram of the third party control and clear start circuit of FIG. 1.

As shown in FIG. 7, the circuit TPS comprises a clear and start portion and a control portion, and implements the required timing sequence used by the third party circuit to place the duplicated processors into a specific state. In addition to the timing requirements, controlled signals and storage are contained on this card for third party use. Each one of the blocks shown in the circuit of FIG. 7 is illustrated in detail in FIGS. 8–13.

Figure 8:
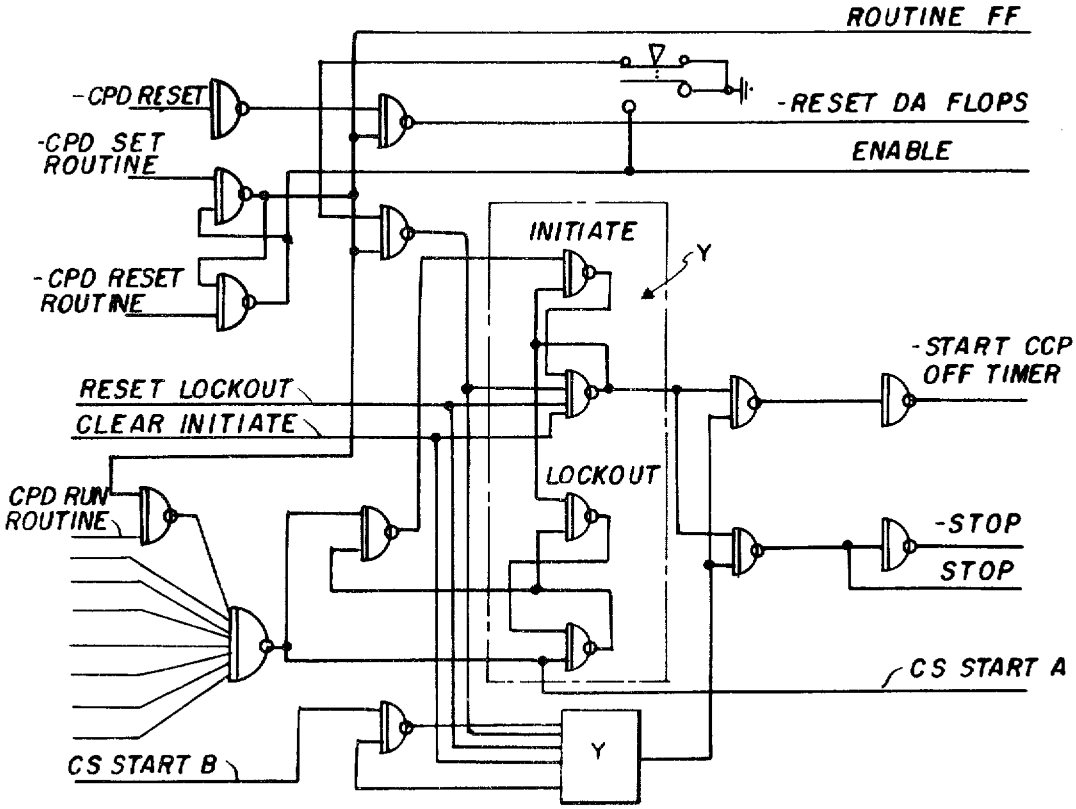
FIGS. 8–13 are functional block diagrams of the third party control and clear start circuit of FIG. 7.

The circuit shown in FIG. 8 is an initiating circuit for the circuit TPS. The circuit TPS can be started by a signal from one of the following seven sources: the watchdog timer of a central processor; a manual switch at the panel of MCC; under program control (CPD CS) if in a trap mode and the initiating CCP is on line; and under program control while routining. Initiating the circuit TPS is caused by one of the above signals setting a storage element. The setting of the storage element, consequently sets another storage element which locks out the initiating signal. The circuit TPS cannot be reinitiated until all the timers have run their course and a reset lockout signal is generated and the originating signal has been removed and then returned. The output of the initiating storage element starts the timers and issues a stop signal that will be sent to the CCP.

For maintenance purposes, four CPDTST leads have been provided for each half of the circuit TPS. By setting the ROUTINE FF, the output of the TPS Sequence will be inhibited. The circuit TPS can then be tested and monitored with no outside affects.

A fifth CPDTST lead (CPD CS) is used for programmed control TPS initiation. A toggle switch is used to inhibit the output of TPS sequencer from affecting the other processor CCP when turning power on.

Figure 9:
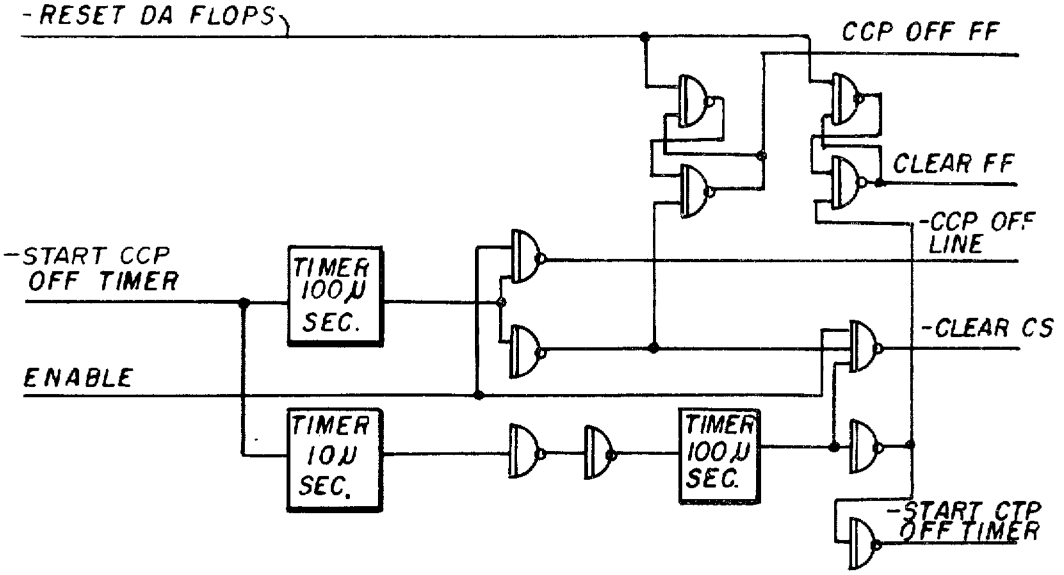

As shown in FIG. 9, the CCP OFF TIMER and the delay timer will be initiated by the setting of the initiated storage element. The CCP OFF TIMER has a delay of 100 micro sec. ±5 percent. This delay insures that a CCP(s) will stop before it is cleared. The delay timer is a 10 micro second ±5 percent clear timer. The purpose of the delay timer is to insure that the clear timer will time out after the CCP OFF TIMER. The CCP OFF FF will be set when the CCP OFF TIMER begins timing. The CLEAR TIMING will set the CLEAR FF when it begins timing. When CCP off timer has timed out and CLEAR TIMER has not, a (-CLEAR CS) signal will be asserted (approx. 10 usec in length). The CTP OFF TIMER (FIG. 10) will be started by a signal from the CLEAR TIMER.

Figure 10:
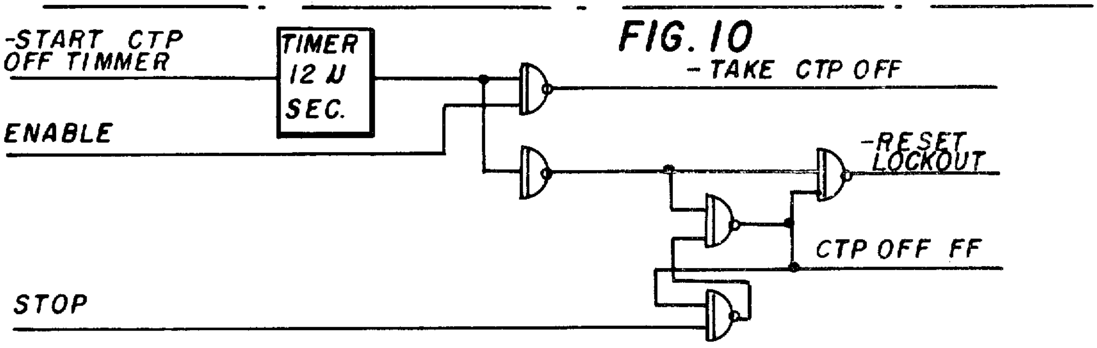

The circuit shown in FIG. 10 contains the CTP OFF TIMER and the CTP OFF FF. The delay timer has a 12 micro second ±5 percent. This timer is made from discrete components. It is used to reset the CTP ON LINE flip-flop in the third party configuration ckt. The 12 micro second delay is long enough to compensate for variations in the clear timer and insure that both TAKE CTP OFF signals from each half of the TPS circuit will overlap. The output of the delay timer (TAKE CTP OFF) will set the CTP OFF FF and after 12 msec will reset the initiate A and B storage elements. The CTP OFF FF will be reset by the resetting of the initiate A and B storage elements via their stop signal.

Control signals to each CCP from the third party are buffered and gated in such a manner that single failure will not affect both CCP(s). The method used is to duplicate the defined signals and to place the hardware within the individual CCP's power module. The circuitry involved is depicted in FIGS. D, E and F.

Figure 11:
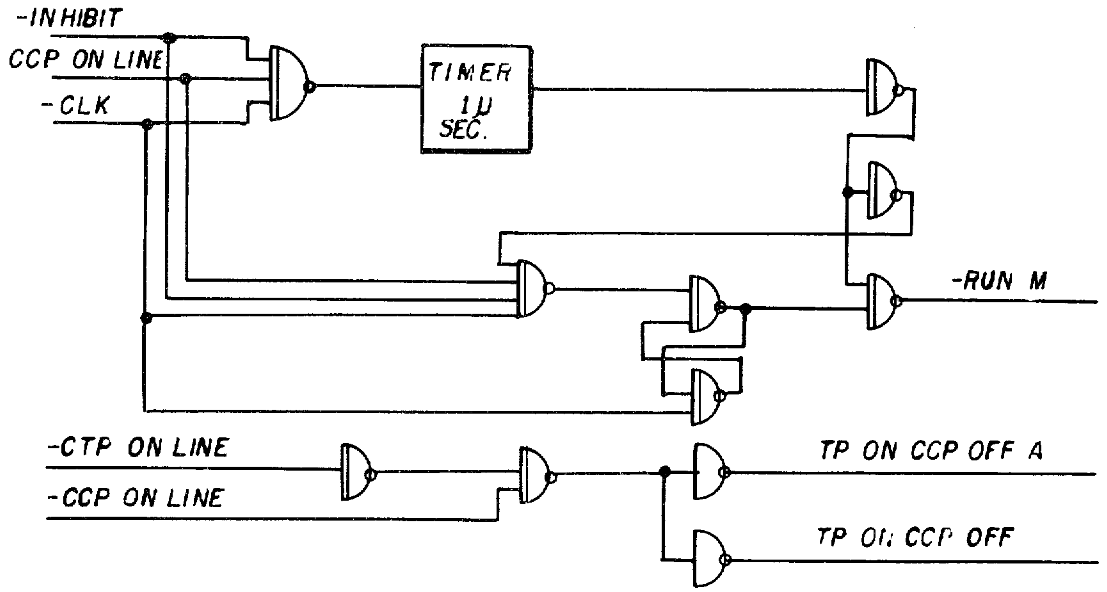

The circuit shown in FIG. 11 depicts the delay circuit used to generate the "-RUN M" signal. The delay circuit is a timer implemented with descrete components. Its delay is 1.155 micro seconds ±20 percent a recovery time of 1.007 micro seconds ±20 percent is required before the timer can be used to attain the specified delay again. The 1.155 ±20 percent micro second delay meets the specified time of 500 nanoseconds approx. required for synchronizing the duplicated CCP(s) before commanding them to RUN. This circuit is initiated when the CCP is placed on line, its (CCP) clock has stopped, and no inhibit (test point) has been applied.

Figure 12:
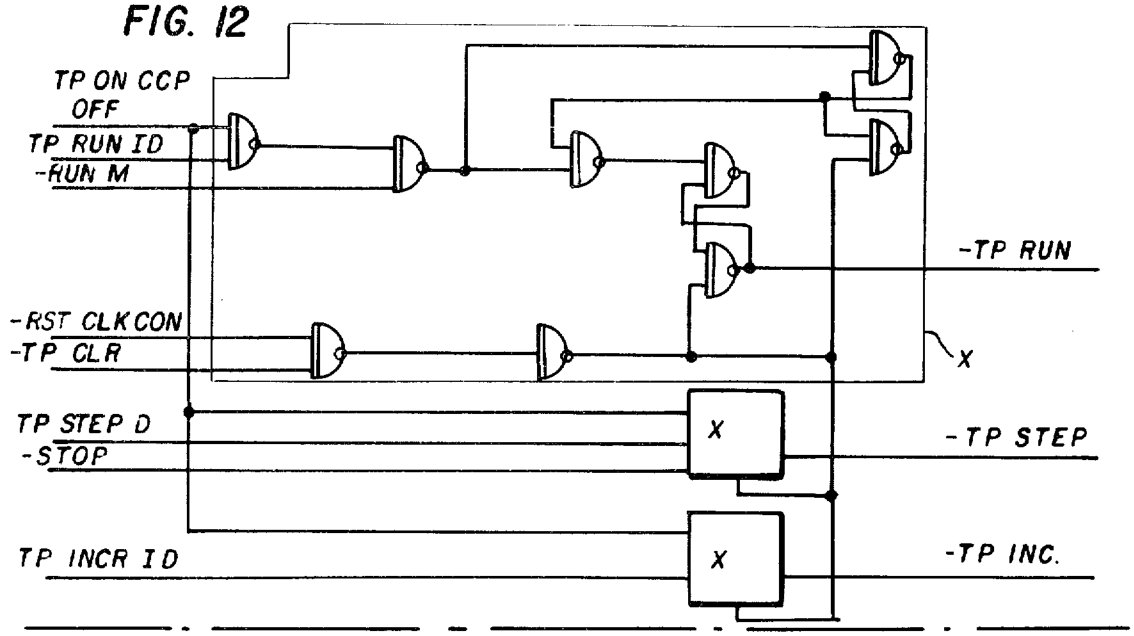
Figure 13:
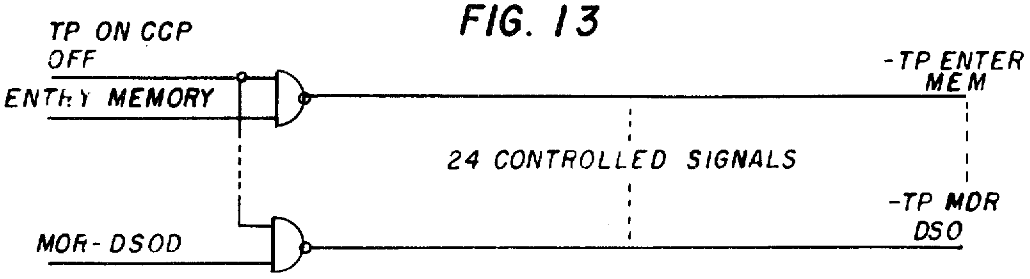

Once the timer has started, a storage element DLY 1 F is set. If this DLY 1 F is still true when the delay occurs the "-RUN M" signal is generated to set the RUN flop as depicted in FIG. 12. The signal "TP ON CPP OFF" is implemented in the circuit of FIG. 11. In the circuit shown in FIG. 12, the following signals are "and" (ed) with TP ON CCP OFF.

ENTER MEM D
DIS MEM D
X1 - DSO D
X2 - DSO D
X3 - DSO D
A - DSO I D
S - DSO D
BUS - DSO I D
PC - DSO D
IR - DSO D

DIAG - DSO D
MDR - DSO D
CON1 - DSO D
CON2 - DSO D
CON3 - DSO D
CON4 - DSO D
LOAG - IR D
LOAD - PC D
TP PULSE D
CCP CLEAR D

Third Party Isolation Circuit

The third party isolation circuit as shown in FIGS. 1 ıd 2 of the drawings includes a pair of "good flop" tches CPGA GOOD F and CPGB GOOD F for gener- ing the respective signals -CPGA and -CPGB during .e operation of the isolation program when a mis- atch occurs between the two computer processors CPA and CCPB, the latches CPGA GOOD F and PGB GOOD F being normally set. When either one ' the latches is reset, the signals -CPGA or -CPGB ıuse the isolation circuit to generate the COMPLETE gnal for the purpose of placing the good computer rocessor CCP on line and thus permit the malfunc- oning or "bad" computer processor CCP off line. A gnal START from the third party configuration cir- ıit sets both the latches CPGA GOOD F and CPGB OOD F, and a pair of OR gates 1510 and 1512 reset ıem. The OR gates 1510 and 1512 are energized when pair of matching or comparison circuits 1414 and 416 indicate a mismatch to reset the latch CPGA OOD F, and a pair of matching or comparison cir- ıits 1418 and 1420 indicate a mismatch to reset the .tch CPGB GOOD F. The matching circuit 1414 com- ares bits 0–15 from the A register (not shown) of the ɔmputer processor CCP-A received via the bus CP-A DATA BUS with bits ROM 0–15 from a read nly memory 1422, which stores the correct informa- on according to the various different steps of the iso- ıtion program run by the computer processor CCP-A nd CCP-B. Similarly, the matching circuit 1416 com- ares bits 16–23 from the bus CCP A DATA BUS with ıe bits ROM 16–23 from the read only memory. For ıe computer processor CCP-B, the matching circuits 418 and 1420 compare the respective bits 0–15 and 6–23 from the bus CCP B DATA BUS with the bits OM 0–15 and ROM 16–23, respectively, from the ɛad only memory 1422. A counter ISO C1 COUNTER 424 is a binary counter used to sequentially access the ɛad only memory 1422 and is advanced by an OR gate 426 which is energized during normal operation by a gnal RUN 1 generated by the output of an AND gate 528 in response to the matching circuits indicating a ıatching condition. The signal RUN 1 is supplied to the ata processors via the configuration circuit TPC to ause them to run a predetermined series of operations f the isolation program in synchronism. Thus, after ach run, if both A registers of the processors match, ıe signal RUN 1 causes the initiation of the next run f the isolation program until a mismatch occurs. The gnal RUN 1 also enables an AND gate 1529 to gener- te a reset signal when the OR gate 1531 is enabled by ither one of the processor clock running.

An AND gate 1530 generates a signal MATCH ›ELAY A for enabling the gate 1528 after a given time elay interval to permit the data present on the data usses from the computer processors to become stabi- lized. The time delay interval is controlled by the out- put signal MATCH DELAY B from a timer 1532. In the preferred embodiment of the present invention, the time 1532 produces a fixed delay time interval of 1,155 NANO seconds and a recovery time of 116 NANO sec- onds. An AND gate 1534 causes the timer 1532 to start its time delay interval in response to both of the com- puter processor clocks (not shown) having stopped to cause the signals CLK A and CLK B from the computer processors CCP A and CCP B, respectively, via the third party logic circuit TPL to be false and in response to the signals ROM 26 and ROM 27 from the read only memory 1422 being false as hereinafter described in greater detail. An OR gate 1536 resets the timer 1532 when the clocks of the computer processors commence running to generate the signals CLK A or CLK B.

During the course of the running of the isolation pro- gram, in order to increment the timing generators (not shown) of the computer processor CCP A and CCP B for causing them to execute a predetermined fewer number of instructions, an AND gate 1438 generates a signal INCR1 for enabling in turn a coincidence AND gate 1439, which generates a signal INCREMENT and supplies it to the logic circuit TPL which in turn causes the timing generators of the processor CCP A and CCP B to be incremented. Incrementing of the timing gener- ators is explained in the SYSTEM patent application. A matching circuit 1440 enables the gate 1438 when a mismatch occurs between the bits ROM 24–27 from the read only memory 1422 and the four bit output sig- nals ISO C2 (0–3) from an isolation C2 binary counter 1442 which is initially preset by a coincidence AND gate 1443. During normal operation when the isolation program is being run and no incrementing procedure is required, the bits ROM 24–27 from the read only mem- ory 1422 match with the preset signal condition of the counter 1442 to inhibit the gate 1438 for preventing an incrementing operation from occurring, but during an incrementing step of the isolation program, the preset condition of the counter 1442 does not match the cor- responding bits ROM 24–27 for that portion of the pro- gram to cause a mismatch to occur and thus the match- ing circuit 1440 generates the signal ISO BITS 24–27. As a result, during an incrementing operation, the sig- nal INCR1 also causes the counter 1442 to be advanced for each increment of the timing generator until the sig- nal condition of the counter 1442 matches the prede- termined code contained in the four bits 24–27 from the read only memory 22, whereby the isolation pro- gram can then be run again. During the incrementing operation, as hereinafter described in greater detail, the signal INCR1 increments the computer processors by causing the levels of the timing generator to be ad- vanced, and thus the computer processor clocks of the timing generators having stopped at either C1 or C2 at level L4, pulse P5 so that the timing generator may be incremented to level L1, pulse P5, as described in the SYSTEM patent application.

A latch START ISO is set upon the recognition of a trap condition to initiate the operation of the arrange- ment of the present invention. A signal START ISOL received via the third party configuration circuit TPC generated in response to a trap condition sets the latch START ISO. However, before the comparisons are made between the signal conditions generated by the computer processors and the correct information stored in the read only memory 1422, both computer processors CCP-A and CCP-B are taken off line and then their timing generators must both cease operation. Therefore, in order to insure that both clocks of both timing generators of the computer processors have stopped and thus the processors are off line prior to performing the isolation functions controlled by the diagnostic arrangement of the present invention, a pair of timers designated timer one and timer two and interconnected sequentially in a free running operation are employed to determine whether or not both of the computer processors CCP-A and CCP-B are taken off line and their clocks have stopped within a given time delay interval, and if the clocks do not stop within that time delay interval, one of the latches CPGA-GOOD F is reset to identify the malfunctioning data processor. In this regard, a coincidence AND gate 1545 responds to a signal START ISO T1 from the latch START ISO and the output of the timer two to set a J-K flip-flop T1, which has one of its DC reset inputs enabled when both of the clock signals CLK A and CLK B are false. If the flip-flop T1 is not reset within the time interval determined by timer one and timer two, the coincidence AND gate 1547 is enabled to generate a signal ISO T1 TO for causing the appropriate one of the latches CPGA GOOD F to be reset.

Considering now the third party isolation circuit in greater detail, the latch CPGA GOOD F is set by the signal START ISOL from the third party configuration circuit TPC, and it is reset via the OR gate 1510, which is energized by a coincidence AND gate 1549 responsive to the matching circuits 1414 and 1416, a clear signal CTP CLR from the computer third party logic circuit TPL for resetting each one of the good flop latches and a pair of routining latches RTN A and RTN B for routining the computer third party circuit, and a coincidence AND gate 1550 which is energized by the signal ISO T1 TO and the signal CLK A being received in a true condition from the logic circuit TPL indicating that the clock of the timing generator of the computer processor CCP-A has failed to stop. Similarly, the OR gate 1512 resets the latch CPGB GOOD F in response to a coincidence AND gate 1551 enabled by the signal ISO T1 TO and a signal CLK B being true, by the output of a coincidence AND gate 1532 which responds to the output of the matching circuits 1418 and 1420 and the signal MATCH DELAY A generated by the gate 1530, and by the clear signal CTP CLR.

An OR gate 1554 enables the gate 1549 when the gate 1554 is de-energized. A pair of coincidence AND gates 1555 and 1556 enable the gate 1554 in response to the outputs of the matching circuits 1414 and 1416, respectively, and to a signal END CNT generated by the ISO C1 COUNTER 1424 indicating that the isolation program is completed, the signal END CNT being false during the operation of the program. Similarly, an OR gate 1557 enabled the gate 1528 to generate the signal RUN I when energized, and when enabled the gate 1552 for resetting the latch CPGB GOOD F when de-energized and the signal MATCH DELAY A is generated. The gate 1557 is enabled by either one of the coincidence AND gates 1559 or 1560, which are in turn enabled by the outputs of the matching circuits 1418 and 1420, respectively. The gate 1530 generates the signal MATCH DELAY A when the signal CCP(s) is true and the signal INHIBIT is true with the signal MATCH DELAY B being generated from the timer 1532. The signal INHIBIT is generated by a latch INHIBIT which is set by means of the signal INCRI generated by the gate 1438 during the incrementing operation. In order to reset the latch INHIBIT, an OR gate 1462 has its output connected to the reset input to the latch INHIBIT and is enabled by a clear signal CTP CLR from the third party logic circuit TPL or by a coincidence AND gate 1464, which is enabled by the signal ISO BITS 24–27 generated by the matching circuit 1440 and by an OR gate 1466. The gate 1466 is enabled either by the output of a coincidence AND gate 1467 or the reset signal RESET T1 generated by the third party logic circuit TPL, the gate 1467 being enabled when both of the clocks of the processors have halted. The timer 1532 is reset by means of the gate 1536 when either one of the clocks of the computer processors starts, and the gate 1534 starts the timer 1532 when both of the clocks have stopped and an OR gate 1569 is enabled. The gate 1569 is enabled during the normal running of the isolation program and not during an incrementing procedure by an inverter gate 1570 which inverts the output of an OR gate 1471, which in turn is enabled by either one of the read only memory output signals ROM 26 or ROM 27, both being false during a normal running of the isolation program. During an incrementing operation, the gate 1569 is enabled by the gate 1438, which in turn is enabled by the gate 1471 and the signal ISO BITS 24–27 from the matching circuit 1440 when both of the computer processor clocks have halted. Thus, each time the signal INCRI is generated during the incrementing operation, the timer 1532 is started. During the normal running of the isolation program, in order to provide for reliability purposes, the gate 1569 is also enabled by the signal ISO BITS to insure the running of the program. The counter 1442 is initially preset by the gate 1443 which is enabled by the signal RUN I generated by the gate 1528 and the output of an OR gate 1473 which in turn is enabled by either one of the computer processor clocks running. The counter 1442 is advanced by the signal INCRI during each step of the incrementing process to generate four bits 0 through 3 which correspond to the read only memory bits ROM 24–27. The read only memory bits ROM 24–27 serve as a special code which normally indicates that no incrementing is required, but when an incrementing operation is to be initiated, the read only memory bits ROM 24–27 comprise a code different from the preset condition of the counter 1442. Thereafter, the matching circuit 1440 causes the incrementing signal INCRI to be generated to cause the counter 1442 to be sequentially advanced until it generates a signal condition which matches the signal condition of the read only memory bits ROM 24–27, thereby causing the signal ISO BITS 24–27 from the matching circuit 1440 to become false and thus stop the incrementing operation. It should be noted that the predetermined code contained in the read only memory bits ROM 24–27 for each step of the isolation program can be adjusted to enable the isolation program to be incremented through a given number of steps according to the predetermined code of the bits ROM 24–27.

In order to reset the latches CPGA GOOD F and CPGB GOOD F if the computer processor clocks have not stopped after a trap condition is detected within the predetermined time delay interval, the gates 1550 and 1552 are enabled by the gate 1547 which generates the signal ISO T1 TO, the gates 1550 and 1551 being enabled by either one or both of the signals CLK A and CLK B, respectively, if either one or both of the computer processor clocks have not stopped and are continuing to run after the predetermined time interval. The gate 1547 is enabled by the output of the timer 2 if the flip-flop T1 remains set. The flip-flop T1 is arranged to change states in response to the output of the gate 1545 which has its output connected to the clock input to the flip-flop T1, whereby the flip-flop T1 responds to negative transitions of the output signal of the gate 1545. The flip-flop T1 is reset by its DC reset in response to the output of an OR gate 1575, which is enabled by the output of a coincidence AND gate 1576 or by a reset signal RESET T1 generated by the logic circuit TPL. The gate 1576 is enabled when both of the computer processor clocks have halted so that once the clocks are halted, the flip-flop T1 is reset to prevent the gate 1547 from being enabled to cause the resetting of the good flops. The gate 1545 is enabled in response to the signal START ISO T1 from the latch START ISO and the output of the timer 2. An OR gate 1480 sets the latch START ISO in response to the signal START ISOL generated in the configuration circuit TPC in response to a trapped signal condition. An OR gate 1481 also enables the gate 1480 in response to the signal RUN I which is used to initiate the running of the isolation program or to the signal INCRI during an incrementing operation, whereby the latch START ISO is set during each run of the isolation program as well as during each step of an incrementing operation. A coincidence AND gate 1482 also enables the gate 1480 to maintain the latch START ISO in its set condition, the gate 1482 being enabled by the one output of the latch START ISO and the output of a coincidence AND gate 1483 which in turn is enabled by the output of the timer 2 and a signal BOTH TRP RESET from the detection circuit TPD, the latter signal initiating in the data processor unit DPU for clearing the isolation circuit TPI and thus is normally false.

Figure 17:
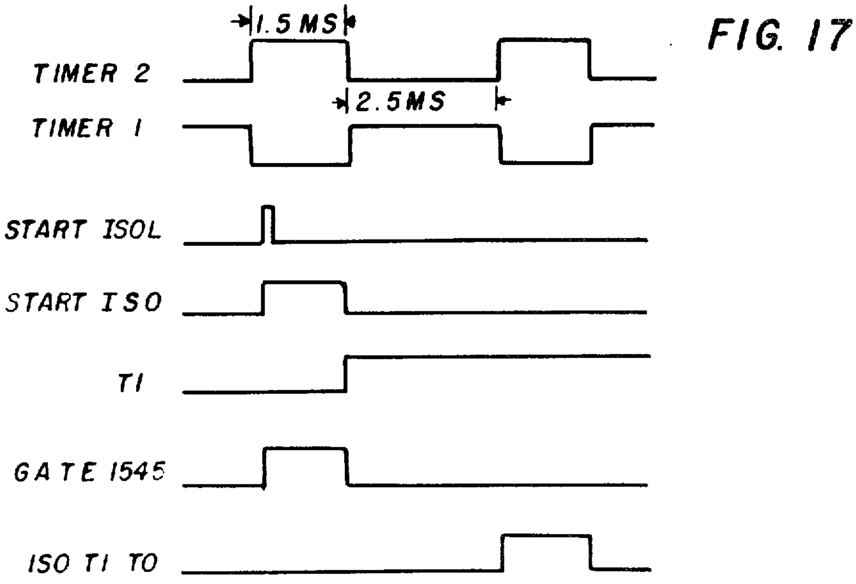
FIG. 17 is a timing diagram of the isolation circuit.

Referring now to FIG. 17, the operation of the timers and the gate 1547 for generating the signal ISO T1 TO will now be considered. Assuming now that the signal START ISOL is generated in response to a trap condition, the latch START ISO is set to generate the signal START ISO, which in turn enables the gate 1545 when the timer 2 signal becomes true. Thereafter, when the timer 2 signal becomes false after a 1.5 millisecond time delay interval of the timer 2, the gate 1545 is deenergized, whereby its negative transition causes the flip-flop T1 to be set. The setting of the flip-flop T1 enables an OR gate 1485 to reset the latch START ISO. Assuming at this point that the computer processor clocks do not stop and continue to run, when the timer 2 output pulse becomes true, the gate 1547 is enabled by the output of the timer 2 and the one output of the flip-flop T1 to generate the signal ISO T1 TO. However, if both computer processor clocks stop before the timer 2 again generates a true output signal, the gate 1575 is enabled by the gate 1576 to enable the DC reset input to the flip-flop T1 for resetting it, whereby the gate 1547 is prevented from being enabled by the timer 2. Also, the stopping of both clocks causes a coincidence AND gate 1490 to be enabled for causing the gate 1485 to reset the latch START ISO.

Considering now in greater detail the routining latches RTN A and RTN B, the latch RTN A is set by a coincidence AND gate 1591, and similarly a coincidence AND gate 1592 sets the latch RTN B. The gate 1591 is enabled by the gate 1554, a coincidence AND gate 1594 enabled by certain signals from the computer processor CCP-A, and an instruction signal CPDTF TF8 from a CPD code for routining purposes. Similarly, the gate 1592 is enabled by a coincidence AND gate 1594 enabled by a certain signal from the computer processor CCP-B, the gate 1557, and the instruction signal CPDTF TF8 for routining the isolation circuit TPI.

What is claimed is:

1. Diagnostic apparatus for controlling the isolation of the cause of fault conditions occurring in data processor means including memory means for storing normal data processing information and for storing test data signals utilizable during diagnostic operations, said processor means normally performing data processing operations and for generating test signals, said processor means generating output signals when operating normally in response to input circuits of said processor means being enabled, said apparatus comprising;

monitoring means responsive to a fault condition occurring in said output signals of said data processor means for generating an isolation signal;

control means responsive to said isolation signal for causing said data processor means to halt its normal processing operations;

means for causing said data processor means to perform at least one series of predetermined operations in response to the stored test input signals from the memory means enabling the input circuits of the data processor means to cause it to generate test output signals in a predetermined manner;

second memory means for storing correct signals corresponding to the expected first and second output test signals; and matching means for comparing at least some of said output test signals with said correct signals to generate a match signal when the compared output test signals are not the same as said correct signals; and means responsive to said match signal to indicate which one of the output test signals did not match with the correct signal, whereby the fault condition is isolated to that portion of the processor means causing the match signal.

2. Diagnostic apparatus according to claim 1, wherein said test signals comprise a series of signal conditions commencing with a first test signal condition and ceasing with a last test signal condition, said matching means including generating means for producing said match signal, matching means including means responsive to only said last signal condition for causing said generating means to generate said match signal.

3. Diagnostic apparatus according to claim 2, further including means responsive to said match signal for causing said data processor means to initiate the running of a second series of predetermined operations in response to said stored input signals to cause the processor means to generate a set of second test signals for comparison with the correct signals stored in said memory means.

4. Diagnostic apparatus according to claim 3, wherein said control means causes said data processor means to initiate sequentially a group of predetermined operations for generating a group of test signal conditions, said matching means comparing the last test signal condition of each test signal condition for generating said match signal to initiate in turn the next series of predetermined operations.

5. Diagnostic apparatus according to claim 4, wherein said data processor means includes first and second data processors operating normally in synchronism in on-line modes of operation, said signals comprising first and second sets of test signals generated by the respective first and second data processors, said matching means comparing said first and second sets of test signals with said correct signals to generate said match signal.

6. Diagnostic apparatus according to claim 4, wherein said correct signals include a plurality of correct signal conditions corresponding to each one of said test signal conditions, each one of said correct signal conditions including coded signals indicative of whether or not an incrementing operation is to be performed, counting means being responsive to said coded signals indicating an incrementing operation for causing said processor means to advance sequentially through a fewer number of said predetermined operations.

7. Diagnostic apparatus according to claim 6, further including at least one good bi-stable device having first and second stable states, said first stable state designating that the compared test signals are not the same as said correct signals, said device being driven to its first stable state by the absence of said match signal after a predetermined timing interval.

8. Diagnostic apparatus according to claim 7, further including timing means for generating said predetermined timing interval.

9. Diagnostic apparatus according to claim 3, wherein said data processor means includes first and second data processors operating normally in synchronism in on-line modes of operation, said test signals comprising first and second sets of test signals generated by the respective first and second data processors, said matching means comparing said first and second sets of test signals with said correct signals to generate said match signal.

10. Diagnostic apparatus for controlling the isolation of the cause of fault conditions occurring in a data processing system having a pair of first and second data processors including first and second memory means for storing normal data processing information and for storing input test data signals utilizable during diagnostic operations, said first and second data processors generating respective first and second output signal conditions when operating normally in response to input circuits being enabled, said apparatus comprising:

fault detecting means responsive to the output signal conditions for causing the generation of an isolation signal indicative of a fault condition when the first and second output signal conditions from the first and second data processors are not identical with respect to one another;

means responsive to said isolation signal for causing both of said processors to halt their normal processing operations, means responsive to the halting of said normal processing operations for causing each one of said first and second data processors to perform at least one predetermined series of operations simultaneously in response to stored test input data signals from the respective memory means enabling the input circuits of the respective first and second data processors to cause them in a predetermined manner to generate test output signals to generate respective first and second output test signal conditions;

third common memory means for storing a correct signal condition corresponding to the expected first and second test output signals; and matching means for comparing at least some of said first and second output test signal conditions from said data processors with correct signal conditions from said third common memory means to generate a match signal when one of said first and second output test signal conditions are not the same as said correct signal condition; and means responsive to said match signal to indicate which one of the first and second test signal condition did not match with the correct signal condition, whereby the fault condition is isolated to one of said first and second data processors.

11. Diagnostic apparatus for a data processor system having first and second data processors normally operating in synchronism, said apparatus comprising:

a common diagnostic access circuit operatively associated with both of said first and said second processors, said access circuit serving as a communication link between said first and said second processors;

circuit means enabling one of said processors to instruct the other one of said processors through said access circuit to perform certain operations;

a configuration circuit for causing said processors to halt their normal operations; and means responsive to said configuration circuit halting said normal operation to enable one of said processors to communicate with the other one of said processors through said access circuit under the control of said circuit means.

12. Diagnostic apparatus according to claim 11, further including a detection circuit for comparing the first and second output signals during normal operation of said first and second processors, means responsive to said detection circuit for generating a trap signal in response to a non-comparison between said selected signal conditions, means responsive to said trap signal to cause said configuration circuit to cause in turn said processors to halt their normal opertions.

* * * * *